(12) United States Patent
Georges et al.

(10) Patent No.: US 10,672,380 B2
(45) Date of Patent: Jun. 2, 2020

(54) DYNAMIC ENROLLMENT OF USER-DEFINED WAKE-UP KEY-PHRASE FOR SPEECH ENABLED COMPUTER SYSTEM

(71) Applicant: INTEL IP CORPORATION, Santa Clara, CA (US)

(72) Inventors: Munir Nikolai Alexander Georges, Kehl (DE); Tobias Bocklet, Munich (DE); Georg Stemmer, Munich (DE); Joachim Hofer, Munich (DE); Josef G. Bauer, Munich (DE)

(73) Assignee: Intel IP Corporation, Santa Clara, CA (US)

(*) Notice: Subject to any disclaimer, the term of this patent is extended or adjusted under 35 U.S.C. 154(b) by 163 days.

(21) Appl. No.: 15/855,379

(22) Filed: Dec. 27, 2017

(65) Prior Publication Data

US 2019/0043481 A1   Feb. 7, 2019

(51) Int. Cl.
*G10L 15/00* (2013.01)
*G10L 15/06* (2013.01)
(Continued)

(52) U.S. Cl.
CPC .......... *G10L 15/063* (2013.01); *G10L 15/02* (2013.01); *G10L 15/187* (2013.01); *G10L 15/22* (2013.01);
(Continued)

(58) Field of Classification Search
CPC ....................................... G10L 15/00
(Continued)

(56) References Cited

U.S. PATENT DOCUMENTS

| 5,632,002 A | 5/1997 | Hashimoto |
| 6,226,612 B1 | 5/2001 | Srenger |

(Continued)

OTHER PUBLICATIONS

Final Rejection received in U.S. Appl. No. 15/483,421 (dated May 23, 2019) (20 pages).

(Continued)

*Primary Examiner* — Michael Colucci
(74) *Attorney, Agent, or Firm* — Finch & Maloney PLLC

(57) ABSTRACT

Techniques are provided for wake-on-voice (WOV) key-phrase enrollment. A methodology implementing the techniques according to an embodiment includes generating a WOV key-phrase model based on identification of the sequence of sub-phonetic units of a user-provided key-phrase. The WOV key-phrase model is employed by a WOV processor for detection of the user spoken key-phrase and triggering operation of an automatic speech recognition (ASR) processor in response to the detection. The method further includes updating an ASR language model based on the user-provided key-phrase. The update includes one of embedding the WOV key-phrase model into the ASR language model, converting sub-phonetic units of the WOV key-phrase model and embedding the converted WOV key-phrase model into the ASR language model, or generating an ASR key-phrase model by applying a phoneme-syllable based statistical language model to the user-provided key-phrase and embedding the generated ASR key-phrase model into the ASR language model.

12 Claims, 6 Drawing Sheets

(51) Int. Cl.
*G10L 15/187* (2013.01)
*G10L 15/02* (2006.01)
*G10L 15/22* (2006.01)
*G10L 15/08* (2006.01)

(52) U.S. Cl.
CPC .................. *G10L 2015/025* (2013.01); *G10L 2015/0635* (2013.01); *G10L 2015/088* (2013.01); *G10L 2015/223* (2013.01)

(58) Field of Classification Search
USPC .......... 704/500, 9, 275, 260, 254, 251, 244; 715/706
See application file for complete search history.

(56) References Cited

U.S. PATENT DOCUMENTS

| | | | |
|---|---|---|---|
| 9,792,897 B1 | 10/2017 | Kaskari | |
| 9,792,907 B2 | 10/2017 | Bocklet | |
| 10,163,438 B2 * | 12/2018 | Clark | G10L 15/063 |
| 10,304,465 B2 * | 5/2019 | Gunn | G06F 3/0488 |
| 10,311,876 B2 * | 6/2019 | Gruenstein | G10L 15/32 |
| 10,332,524 B2 * | 6/2019 | Lindahl | G10L 15/32 |
| 10,504,511 B2 * | 12/2019 | Wang | G10L 15/1815 |
| 2001/0056364 A1 * | 12/2001 | Diederiks | G06F 3/04817 |
| | | | 715/706 |
| 2002/0042713 A1 | 4/2002 | Kim | |
| 2007/0271086 A1 | 11/2007 | Peters | |
| 2010/0142715 A1 | 6/2010 | Goldstein | |
| 2011/0288859 A1 | 11/2011 | Taylor | |
| 2012/0265533 A1 * | 10/2012 | Honeycutt | G10L 13/033 |
| | | | 704/260 |
| 2013/0289994 A1 | 10/2013 | Newman et al. | |
| 2013/0317823 A1 | 11/2013 | Mengibar | |
| 2014/0257813 A1 | 9/2014 | Mortensen | |
| 2014/0278435 A1 * | 9/2014 | Ganong, III | G10L 15/22 |
| | | | 704/275 |
| 2015/0039303 A1 | 2/2015 | Lesso | |
| 2015/0106085 A1 | 4/2015 | Lindahl | |
| 2015/0154953 A1 * | 6/2015 | Bapat | G10L 15/06 |
| | | | 704/251 |
| 2015/0221307 A1 | 8/2015 | Shah | |
| 2015/0302001 A1 * | 10/2015 | Walther | G10L 13/04 |
| | | | 704/9 |
| 2016/0055859 A1 | 2/2016 | Finlow-Bates | |
| 2016/0104480 A1 * | 4/2016 | Sharifi | G10L 15/22 |
| | | | 704/254 |
| 2016/0155443 A1 * | 6/2016 | Khan | G06F 1/3203 |
| | | | 704/275 |
| 2016/0171975 A1 | 6/2016 | Sun et al. | |
| 2016/0267913 A1 * | 9/2016 | Kim | G10L 15/22 |
| 2016/0379632 A1 | 12/2016 | Hoffmeister | |
| 2017/0025124 A1 * | 1/2017 | Mixter | G10L 15/32 |
| 2017/0148444 A1 | 5/2017 | Bocklet | |
| 2017/0178625 A1 | 6/2017 | Mamou | |
| 2017/0185375 A1 | 6/2017 | Martel | |
| 2017/0194001 A1 | 7/2017 | Mortensen | |
| 2017/0301350 A1 | 10/2017 | Mengibar | |
| 2018/0005633 A1 | 1/2018 | Bocklet | |
| 2018/0033438 A1 * | 2/2018 | Toma | G10L 15/22 |
| 2018/0108343 A1 * | 4/2018 | Stevans | G10L 13/043 |

OTHER PUBLICATIONS

U.S. Appl. No. 15/390,384, filed Dec. 23, 2016, 62 pages.
International Search Report and Written Opinion received for PCT application No. PCT/US2018/061728, dated Feb. 28, 2019. 9 pages.

* cited by examiner

DYNAMIC ENROLLMENT OF USER-DEFINED WAKE-UP KEY-PHRASE FOR SPEECH ENABLED COMPUTER SYSTEM

BACKGROUND

Some computer systems or platforms become active or "wake-up" in response to the detection of a keyword or key-phrase spoken by the user. After wake-up, the computer proceeds to recognize and process the additional user speech that follows the keyword. Such systems employ speech recognition techniques and typically require that the key-phrase be pre-defined (e.g., static) rather than user selectable, which is undesirable. Some other systems require that the user pause between the wake-up keyword and the remainder of the spoken request in order to switch processing modes (e.g., from keyword spotting mode to full speech recognition mode). Such a pause creates an interruption in the natural flow of speech and negatively impacts the quality of the user experience.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
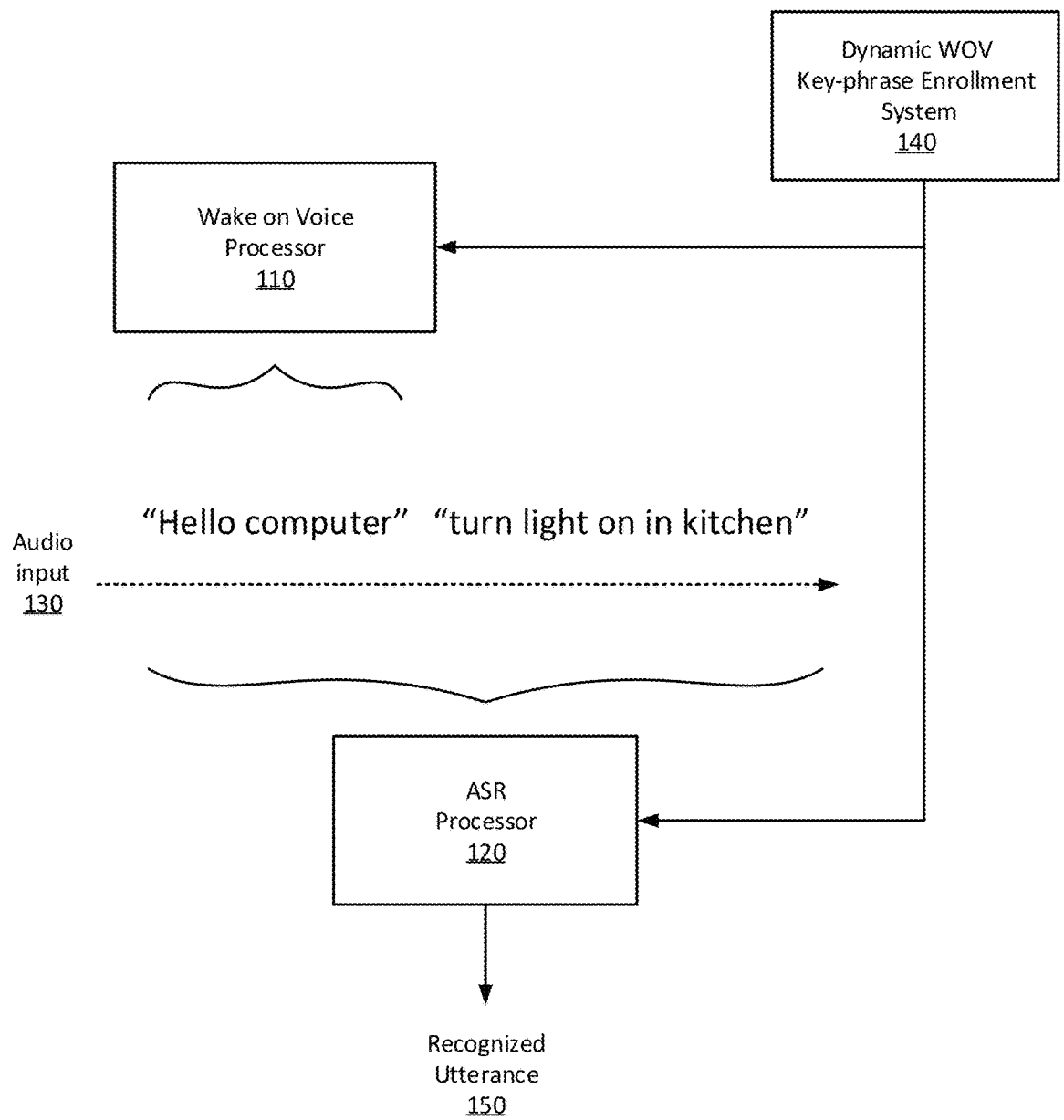
FIG. 1 is a top-level block diagram of a speech enabled computer system with dynamic wake-on-voice (WOV) key-phrase enrollment, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for dynamic wake-on-voice (WOV) key-phrase enrollment in a spoken language understanding system that employs a combination of WOV key-phrase spotting and automatic speech recognition (ASR). Key-phrase spotting techniques are employed to detect the utterance, by a user, of a wake-up phrase which can then trigger the ASR to recognize the full request spoken by the user, including the wake-up phrase. Although the key-phrase detection and ASR systems generally use different language models, the disclosed techniques provide for some degree of sharing, of a runtime generated key-phrase model, between the two systems, as will be explained in greater detail below. The techniques allow the user to dynamically select or customize the system to detect any desired wake-up phrase, which would not otherwise be possible in a system that uses separate dedicated models for key-phrase detection and speech recognition.

The disclosed techniques can be implemented, for example, in a computing system or a software product executable or otherwise controllable by such systems, although other embodiments will be apparent. The system or product is configured to provide dynamic WOV key-phrase enrollment. In accordance with an embodiment, a methodology to implement these techniques includes generating a WOV key-phrase model based on identification and determination of a correct sequence of sub-phonetic units of a user-provided key-phrase. The WOV key-phrase model is employed by a WOV processor for detection of the key-phrase spoken by the user and for triggering operation of an automatic speech recognition (ASR) processor in response to the detection. The method further includes updating an ASR language model based on the user-provided key-phrase, as will be explained in greater detail below. In some embodiments, the update can include embedding the WOV key-phrase model into the ASR language model. In other embodiments, the update can include performing a conversion of sub-phonetic units of the WOV key-phrase model and embedding the converted WOV key-phrase model into the ASR language model. In still other embodiments the update can include generating an ASR key-phrase model by applying a phoneme-syllable based statistical language model to the user-provided key-phrase and embedding the generated ASR key-phrase model into the ASR language model. In still other embodiments, the user-provided key-phrase may be provided as a text entry, which can be provided directly to the WOV processor and the ASR processor for enrollment.

As will be appreciated, the techniques described herein may allow for an improved user experience with a speech language understanding system, by providing for dynamic enrollment of user selected wake-up key-phrases in a manner that is relatively convenient and transparent to the user, compared to existing methods that impose static key-phrase requirements or require awkward pauses between the key-phrase and the subsequent speech. The disclosed techniques can be implemented on a broad range of platforms including laptops, tablets, smart phones, workstations, and embedded systems or devices. These techniques may further be implemented in hardware or software or a combination thereof.

FIG. 1 is a top-level block diagram of a speech enabled computer system 100 with dynamic wake-on-voice (WOV) key-phrase enrollment, configured in accordance with certain embodiments of the present disclosure. The speech enabled computer system 100 is shown to include a WOV processor 110, an ASR processor 120, and a dynamic WOV key-phrase enrollment system 140. In some embodiments, the speech enabled computer system 100 may be hosted on a computing or communications platform, as described in greater detail in connection with FIG. 6 below.

An example of audio input 130 is shown to include speech from the user, in this example: "hello computer turn light on in kitchen." The audio input may be provided by a microphone, an array of microphones (e.g., configured for beamforming), or any other suitable audio capture device, or from a stored recording. The WOV processor 110 is configured to detect the key-phrase "hello computer," which has been selected by the user through a dynamic enrollment process implemented by the dynamic WOV key-phrase enrollment system 140, from the audio input 130. The operations of the dynamic WOV key-phrase enrollment system 140 are described in greater detail below. The WOV processor 110 is further configured to trigger the ASR processor 120 to recognize the entire spoken utterance including both the key-phrase and the remaining user request to turn on the kitchen lights. In some embodiments, the trigger may further be used to wake the computing platform, or any portion thereof, from a sleep or idle state to an active recognition state.

In some embodiments, the WOV processor 110 employs known key-phrase detection techniques, in light of the present disclosure. These key-phrase detection techniques may further employ a key-phrase model which includes the wake-up key-phrases, whether predefined or chosen by the user, and an acoustic model which is used for lower level analysis of phonemes and sub-phonetic units after application of the key-phrase model.

In some embodiments, the ASR processor 120 employs known speech recognition techniques, in light of the present disclosure. These speech recognition techniques may further employ a language model, separate from the key-phrase model, which includes the wake-up key-phrases in addition to a grammar of expected user requests. As a simplified example, the ASR language model could be a grammar that can recognize "[start|stop|pause] playback" and the key-phrase is "hello computer." In this case, the combined grammar that is understood by the language model is "hello computer [start|stop|pause] playback."

In some embodiments, the WOV processor or circuit 110 is configured to consume less power than the ASR processor or circuit 120, at least when the ASR processor is in the higher power consumption recognition state, allowing for power optimization between these two functions. For example, in some embodiments, the WOV processor 110 may be implemented on a low power CPU or digital signal processor (DSP), and the ASR processor 120 may be implemented on a hardware accelerator or suitably optimized coprocessor.

Figure 2:
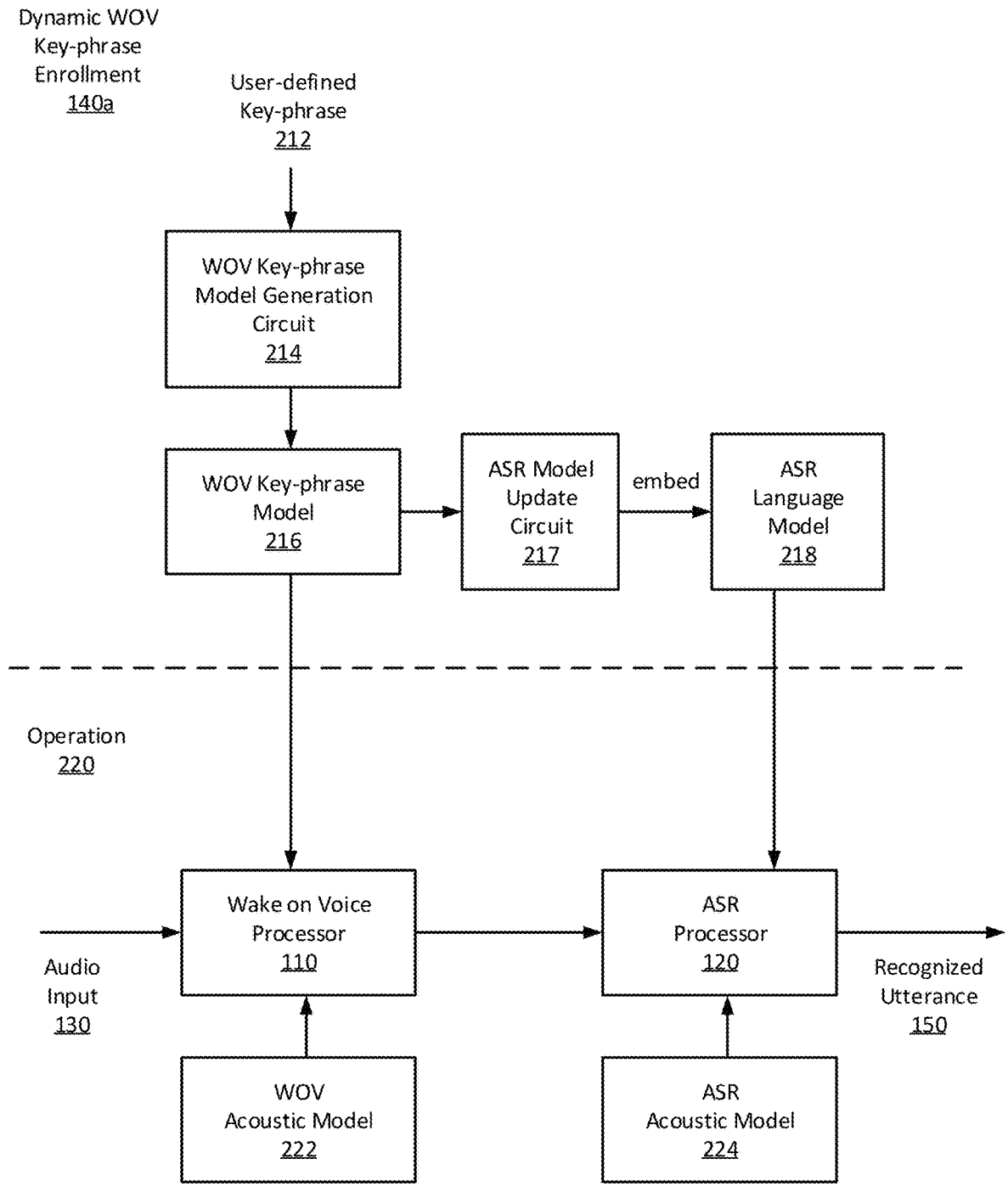
FIG. 2 is a block diagram of a dynamic WOV key-phrase enrollment system, configured in accordance with certain embodiments of the present disclosure.

FIG. 2 is a block diagram of a dynamic WOV key-phrase enrollment system 140a, configured in accordance with certain embodiments of the present disclosure. The dynamic WOV key-phrase enrollment system 140a is shown to include a WOV key-phrase model generation circuit 214, a WOV key-phrase model 216, an ASR model update circuit 217, and an ASR language model 218. Additionally, a WOV acoustic model 222 is shown to be employed by the wake on voice processor 110, and an ASR acoustic model 224 is shown to be employed by the ASR processor 120.

The WOV key-phrase model generation circuit 214 is configured to generate the WOV key-phrase model 216 based on identification and determination of a correct sequence of sub-phonetic units of a user-provided WOV enrollment key-phrase 212. The WOV key-phrase model 216 is employed by the WOV processor 110 for detection of the WOV key-phrase from audio input 130 spoken by the user during operation 220.

The ASR model update circuit 217 is configured to update the ASR language model 218 based on the user-provided WOV enrollment key-phrase 212. The ASR language model 218 is employed by the ASR processor 120 for recognizing speech utterances from audio input 130 spoken by the user during operation 220. The update is accomplished by incorporating or embedding the generated WOV key-phrase model 216 into the ASR language model 218, using known techniques in light of the present disclosure. This technique assumes that the WOV acoustic model 222 and the ASR acoustic model 224 are relatively comparable to the extent that they use common phonemes and state sequences (e.g., they use at least some of the same phonemes and state sequences).

Figure 3:
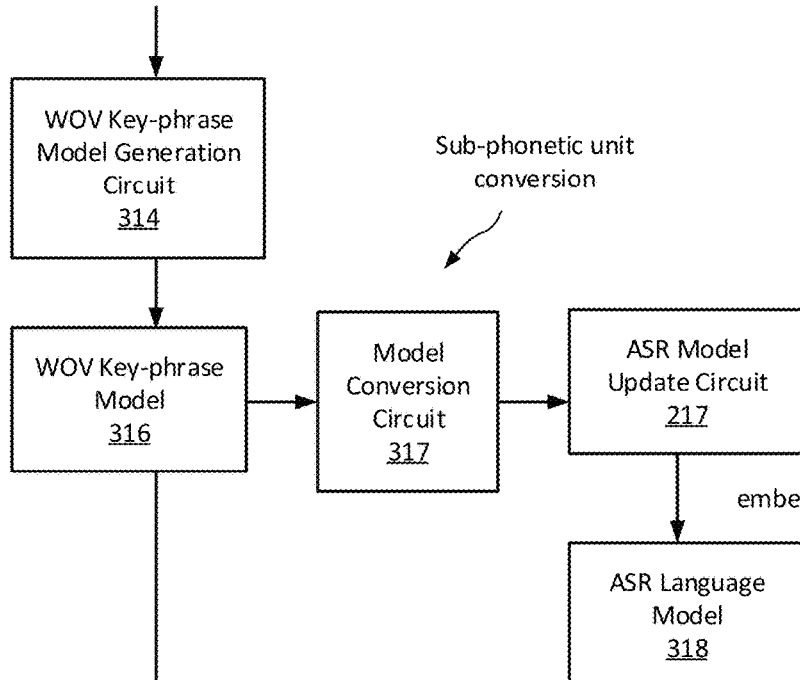
FIG. 3 is another block diagram of a dynamic WOV key-phrase enrollment system, configured in accordance with certain embodiments of the present disclosure.
Figure 3:
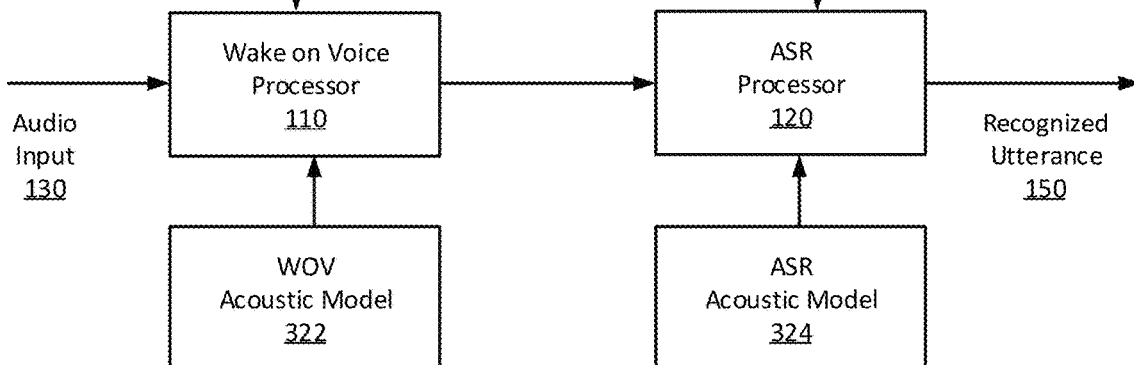

FIG. 3 is another block diagram of a dynamic WOV key-phrase enrollment system 140b, configured in accordance with certain embodiments of the present disclosure. The dynamic WOV key-phrase enrollment system 140b is shown to include a WOV key-phrase model generation circuit 314, a WOV key-phrase model 316, a model conversion circuit 317, an ASR model update circuit 217, and an ASR language model 318. Additionally, a WOV acoustic model 322 is shown to be employed by the wake on voice processor 110, and an ASR acoustic model 324 is shown to be employed by the ASR processor 120.

The WOV key-phrase model generation circuit 314 is configured to generate the WOV key-phrase model 316 based on identification and determination of a correct sequence of sub-phonetic units of a user-provided WOV enrollment key-phrase 212. The WOV key-phrase model 316 is employed by the WOV processor 110 for detection of the WOV key-phrase from audio input 130 spoken by the user during operation 220. The model conversion circuit 317 is configured to perform a conversion of sub-phonetic units of the WOV key-phrase model 316, using known techniques in light of the present disclosure.

The ASR model update circuit 217 is configured to update the ASR language model 318 by incorporating or embedding the converted WOV key-phrase model, generated by model conversion circuit 317, into the ASR language model 318, using known techniques in light of the present disclosure. This is generally possible even though the WOV acoustic model 322 may differ from the ASR acoustic model 324, which is typically the case of most applications, since the conversion of sub-phonetic units provides compatibility between the converted WOV key-phrase model and the ASR language model. This technique assumes that the sub-phonetic unit conversion is possible for the given models, which may not always be the case.

Figure 4:
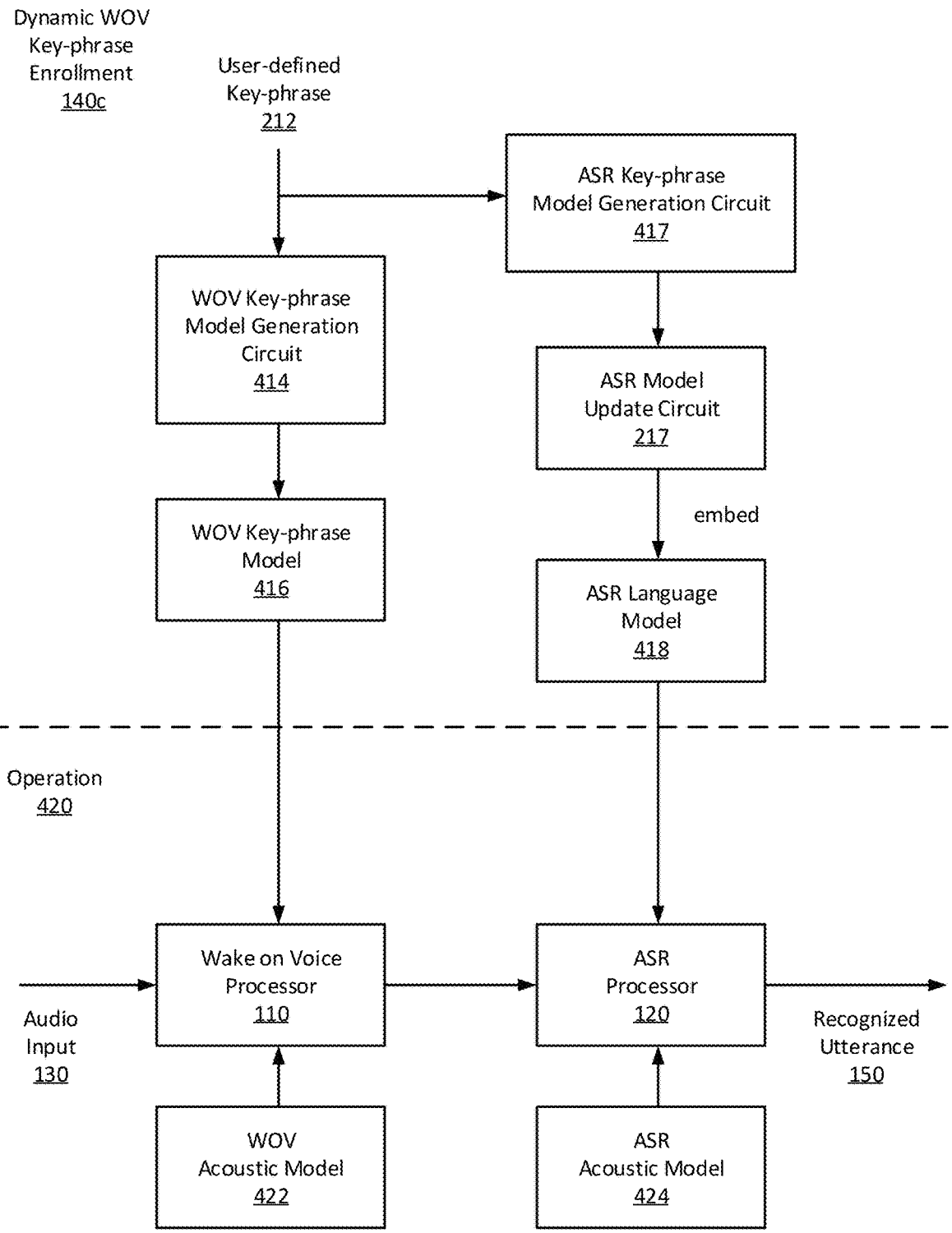
FIG. 4 is another block diagram of a dynamic WOV key-phrase enrollment system, configured in accordance with certain embodiments of the present disclosure.

FIG. 4 is another block diagram of a dynamic WOV key-phrase enrollment system 140c, configured in accordance with certain embodiments of the present disclosure. The dynamic WOV key-phrase enrollment system 140c is shown to include a WOV key-phrase model generation circuit 414, a WOV key-phrase model 416, an ASR key-phrase model generation circuit 417, an ASR model update circuit 217, and an ASR language model 418. Additionally, a WOV acoustic model 422 is shown to be employed by the wake on voice processor 110, and an ASR acoustic model 424 is shown to be employed by the ASR processor 120.

The WOV key-phrase model generation circuit 414 is configured to generate the WOV key-phrase model 416 based on identification and determination of a correct sequence of sub-phonetic units of a user-provided WOV enrollment key-phrase 212. The WOV key-phrase model 416 is employed by the WOV processor 110 for detection of the WOV key-phrase from audio input 130 spoken by the user during operation 220.

The ASR key-phrase model generation circuit 417 is configured to generate an ASR key-phrase model by applying a phoneme-syllable based statistical language model (SLM) to the user-provided WOV enrollment key-phrase 212. The SLM computes the probability of a word given the history of previously recognized words (e.g., based on hidden Markov models or maximum entropy models). The key-phrase is recognized and extracted from the recognition result lattice (which represents different hypotheses about what has been spoken), and the lattice can then be directly embedded into the statistical language model of the ASR.

The ASR model update circuit 217 is configured to update the ASR language model 418 by incorporating or embedding the new ASR key-phrase model, generated by ASR key-phrase model generation circuit 417, into the ASR language model 418, using known techniques in light of the present disclosure. This is generally possible without requiring any assumptions about the WOV acoustic model 422 and the ASR acoustic model 424, other than that the same ASR acoustic model 424 is used by the ASR processor 120 and the ASR key-phrase model generation circuit 417.

In some embodiments, the dynamic WOV key-phrase enrollment system 140 may also include a grapheme to phoneme conversion circuit (not shown in the Figures) to enable the user defined key-phrase 212 to be entered as text. The grapheme to phoneme conversion circuit is configured to convert the text entry to phonemes for the generation of the WOV key-phrase models by WOV key-phrase model generation circuits 214, 314, 414. The grapheme to phoneme mapping may be provided directly by the user or available as a statistical model generated through a machine learning process, using known techniques in light of the present disclosure.

Methodology

Figure 5:
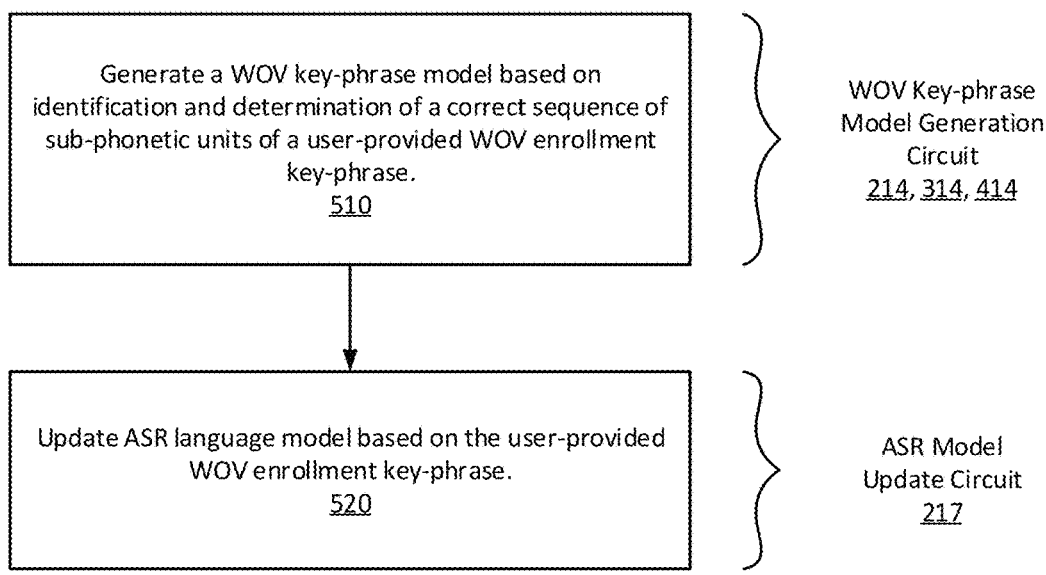
FIG. 5 is a flowchart illustrating a methodology for dynamic WOV key-phrase enrollment, in accordance with certain embodiments of the present disclosure.

FIG. 5 is a flowchart illustrating an example method 500 for dynamic WOV key-phrase enrollment, in accordance with certain embodiments of the present disclosure. As can be seen, the example method includes a number of phases and sub-processes, the sequence of which may vary from one embodiment to another. However, when considered in the aggregate, these phases and sub-processes form a process for key-phrase enrollment in accordance with certain of the embodiments disclosed herein. These embodiments can be implemented, for example using the system architecture illustrated in FIGS. 1-4 as described above. However other system architectures can be used in other embodiments, as will be apparent in light of this disclosure. To this end, the correlation of the various functions shown in FIG. 5 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 500. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 5, in an embodiment, method 500 for dynamic WOV key-phrase enrollment commences by generating, at operation 510, a WOV key-phrase model based on identification and determination of a correct sequence of sub-phonetic units of a user-provided WOV enrollment key-phrase. The WOV key-phrase model is employed by a WOV processor for detection of the WOV key-phrase, when spoken by the user, to trigger operation of an ASR processor in response to the key-phrase detection.

Next, at operation 520, an ASR language model is updated based on the user-provided WOV enrollment key-phrase. The ASR language model is employed by the ASR processor for recognizing speech utterances spoken by the user.

In some embodiments, the updating of the ASR language model further includes incorporating the WOV key-phrase model directly into the ASR language model. In other embodiments, the updating of the ASR language model further includes performing a sub-phonetic conversion of the WOV key-phrase model and incorporating the converted WOV key-phrase model into the ASR language model. In still other embodiments, the updating of the ASR language model further includes generating an ASR key-phrase model by applying a phoneme-syllable based statistical language model to the user-provided WOV enrollment key-phrase and incorporating the generated ASR key-phrase model into the ASR language model.

Of course, in some embodiments, additional operations may be performed, as previously described in connection with the system. For example, the user-provided WOV enrollment key-phrase may be provided as a text entry, in which case a grapheme to phoneme conversion may be performed on the text entry for the generation of the WOV key-phrase model. In some embodiments, the triggering of the ASR processor may further include waking the ASR processor from a lower power consuming idle state to a higher power consuming recognition state.

Example System

Figure 6:
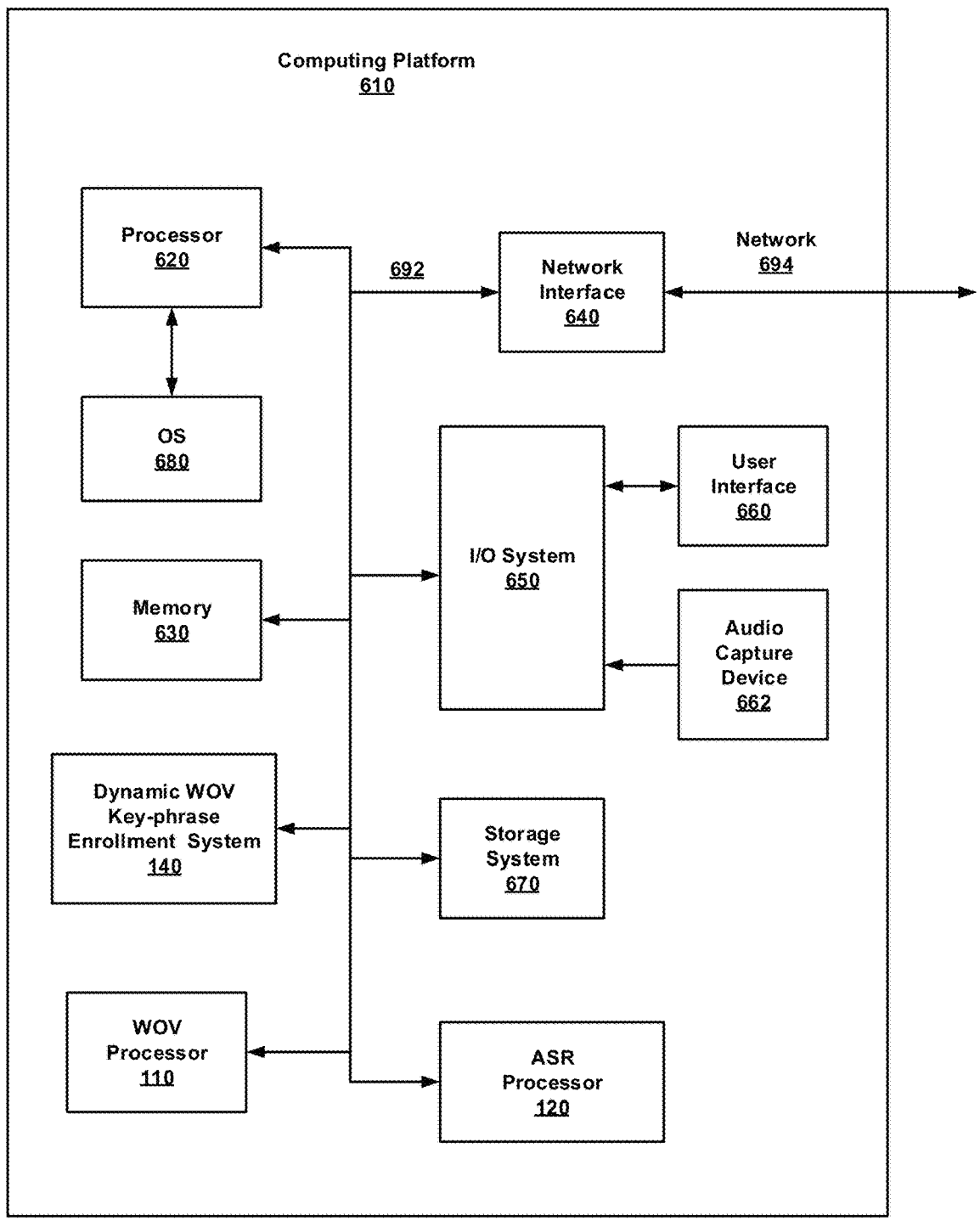
FIG. 6 is a block diagram schematically illustrating a computing platform configured to perform dynamic WOV key-phrase enrollment, in accordance with certain embodiments of the present disclosure.

FIG. 6 illustrates an example system 600 to perform dynamic WOV key-phrase enrollment, configured in accordance with certain embodiments of the present disclosure. In some embodiments, system 600 comprises a computing platform 610 which may host, or otherwise be incorporated into a personal computer, workstation, server system, smart home management system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, platform 610 may comprise any combination of a processor 620, a memory 630, dynamic WOV key-phrase enrollment system 140, WOV processor 110, ASR processor 120, a network interface 640, an input/output (I/O) system 650, a user interface 660, an audio capture device 662, and a storage system 670. As can be further seen, a bus and/or interconnect 692 is also provided to allow for communication between the various components listed above and/or other components not shown. Platform 610 can be coupled to a network 694 through network interface 640 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with system 600. In some embodiments, the processor 620 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random-access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included. In some embodiments, the WOV key-phrase models, the ASR language models, and the acoustic models may be stored in separate blocks or regions of memory.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 600, and therefore may also be implemented using any suitable existing or subsequently-developed platform.

Network interface circuit 640 can be any appropriate network chip or chipset which allows for wired and/or wireless connection between other components of computer system 600 and/or network 694, thereby enabling system 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of computer system 600. I/O devices may include, but not be limited to, user interface 660 and audio capture device 662 (e.g., a microphone). User interface 660 may include devices (not shown) such as a display element, touchpad, keyboard, mouse, and speaker, etc. I/O system 650 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 610.

It will be appreciated that in some embodiments, the various components of the system 600 may be combined or integrated in a system-on-a-chip (SoC) architecture. In some embodiments, the components may be hardware components, firmware components, software components or any suitable combination of hardware, firmware or software.

Dynamic WOV key-phrase enrollment system 140 is configured to generate WOV key-phrase models and update ASR language models at run-time, to enable users to define new WOV key-phrases, as described previously. Dynamic WOV key-phrase enrollment system 140 may include any or all of the circuits/components illustrated in FIGS. 1-4, as described above. These components can be implemented or otherwise used in conjunction with a variety of suitable software and/or hardware that is coupled to or that otherwise forms a part of platform 610. These components can additionally or alternatively be implemented or otherwise used in conjunction with user I/O devices that are capable of providing information to, and receiving information and commands from, a user.

In some embodiments, these circuits may be installed local to system 600, as shown in the example embodiment of FIG. 6. Alternatively, system 600 can be implemented in a client-server arrangement wherein at least some functionality associated with these circuits is provided to system 600 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 694 or remotely coupled to network 694 by one or more other networks and/or communication channels. In some cases, access to resources on a given network or computing system may require credentials such as usernames, passwords, and/or compliance with any other suitable security mechanism.

In various embodiments, system 600 may be implemented as a wireless system, a wired system, or a combination of both. When implemented as a wireless system, system 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the dynamic key-phrase enrollment methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. In other embodiments, the functionalities disclosed herein can be incorporated into other speech-based software applications, such as, for example, automobile control/navigation, smart-home management, entertainment, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for wake-on-voice (WOV) key-phrase enrollment, the method comprising: generating, by a processor-based system, a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection; and updating, by the processor-based system, an ASR language model based on the user-provided WOV enrollment key-phrase, the ASR language model employed by the ASR processor for recognizing speech utterances spoken by the user.

Example 2 includes the subject matter of Example 1, wherein the updating of the ASR language model comprises incorporating the WOV key-phrase model into the ASR language model.

Example 3 includes the subject matter of Examples 1 or 2, wherein the WOV processor uses a first acoustic model (AM), the ASR processor uses a second acoustic model (AM), and the first AM and the second AM use common phonemes and state sequences.

Example 4 includes the subject matter of any of Examples 1-3, wherein the updating of the ASR language model comprises performing a conversion of the sub-phonetic units of the WOV key-phrase model and incorporating the converted WOV key-phrase model into the ASR language model.

Example 5 includes the subject matter of any of Examples 1-4, wherein the updating of the ASR language model comprises generating an ASR key-phrase model by applying a phoneme-syllable based statistical language model to the user-provided WOV enrollment key-phrase and incorporating the generated ASR key-phrase model into the ASR language model.

Example 6 includes the subject matter of any of Examples 1-5, wherein the user-provided WOV enrollment key-phrase is provided as a text entry, the method further comprising performing a grapheme to phoneme conversion on the text entry for the generation of the WOV key-phrase model.

Example 7 includes the subject matter of any of Examples 1-6, wherein the triggering of the ASR processor comprises waking the ASR processor from a lower power consuming idle state to a higher power consuming recognition state.

Example 8 includes the subject matter of any of Examples 1-7, wherein the WOV processor consumes less power than the ASR processor when the ASR processor is in the higher power consuming recognition state.

Example 9 is a system for wake-on-voice (WOV) key-phrase enrollment, the system comprising: a WOV key-phrase model generation circuit to generate a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection; and an ASR model update circuit to update an ASR language model based on the user-provided WOV enrollment key-phrase, the ASR language model employed by the ASR processor for recognizing speech utterances spoken by the user.

Example 10 includes the subject matter of Example 9, wherein the ASR model update circuit is further to incorporate the WOV key-phrase model into the ASR language model.

Example 11 includes the subject matter of Examples 9 or 10, wherein the WOV processor uses a first acoustic model (AM), the ASR processor uses a second acoustic model (AM), and the first AM and the second AM use common phonemes and state sequences.

Example 12 includes the subject matter of any of Examples 9-11, further comprising a model conversion circuit to perform a conversion of the sub-phonetic units of the WOV key-phrase model and incorporate the converted WOV key-phrase model into the ASR language model.

Example 13 includes the subject matter of any of Examples 9-12, further comprising an ASR key-phrase model generation circuit to generate an ASR key-phrase model by applying a phoneme-syllable based statistical language model to the user-provided WOV enrollment key-phrase and incorporate the generated ASR key-phrase model into the ASR language model.

Example 14 includes the subject matter of any of Examples 9-13, wherein the user-provided WOV enrollment key-phrase is provided as a text entry, the system further comprises a grapheme to phoneme conversion circuit to convert the text entry to phonemes for the generation of the WOV key-phrase model.

Example 15 includes the subject matter of any of Examples 9-14, wherein the triggering of the ASR processor comprises waking the ASR processor from a lower power consuming idle state to a higher power consuming recognition state.

Example 16 includes the subject matter of any of Examples 9-15, wherein the WOV processor consumes less power than the ASR processor when the ASR processor is in the higher power consuming recognition state.

Example 17 is at least one non-transitory computer readable storage medium having instructions encoded thereon that, when executed by one or more processors, result in the following operations for wake-on-voice (WOV) key-phrase enrollment, the operations comprising: generating a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection; and updating an ASR language model based on the user-provided WOV enrollment key-phrase, the ASR language model employed by the ASR processor for recognizing speech utterances spoken by the user.

Example 18 includes the subject matter of Example 17, wherein the updating of the ASR language model comprises the operation of incorporating the WOV key-phrase model into the ASR language model.

Example 19 includes the subject matter of Examples 17 or 18, wherein the WOV processor uses a first acoustic model (AM), the ASR processor uses a second acoustic model (AM), and the first AM and the second AM use common phonemes and state sequences.

Example 20 includes the subject matter of any of Examples 17-19, wherein the updating of the ASR language model comprises the operations of performing a conversion of the sub-phonetic units of the WOV key-phrase model and incorporating the converted WOV key-phrase model into the ASR language model.

Example 21 includes the subject matter of any of Examples 17-20, wherein the updating of the ASR language model comprises the operations of generating an ASR key-phrase model by applying a phoneme-syllable based statistical language model to the user-provided WOV enrollment key-phrase and incorporating the generated ASR key-phrase model into the ASR language model.

Example 22 includes the subject matter of any of Examples 17-21, wherein the user-provided WOV enrollment key-phrase is provided as a text entry, further comprising the operation of performing a grapheme to phoneme conversion on the text entry for the generation of the WOV key-phrase model.

Example 23 includes the subject matter of any of Examples 17-22, wherein the triggering of the ASR processor comprises the operation of waking the ASR processor from a lower power consuming idle state to a higher power consuming recognition state.

Example 24 includes the subject matter of any of Examples 17-23, wherein the WOV processor consumes less power than the ASR processor when the ASR processor is in the higher power consuming recognition state.

Example 25 is a system for wake-on-voice (WOV) key-phrase enrollment, the system comprising: means for generating a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection; and means for updating an ASR language model based on the user-provided WOV enrollment key-phrase, the ASR language model employed by the ASR processor for recognizing speech utterances spoken by the user.

Example 26 includes the subject matter of Example 25, wherein the updating of the ASR language model comprises means for incorporating the WOV key-phrase model into the ASR language model.

Example 27 includes the subject matter of Examples 25 or 26, wherein the WOV processor uses a first acoustic model (AM), the ASR processor uses a second acoustic model (AM), and the first AM and the second AM use common phonemes and state sequences.

Example 28 includes the subject matter of any of Examples 25-27, wherein the updating of the ASR language model comprises means for performing a conversion of the sub-phonetic units of the WOV key-phrase model and means for incorporating the converted WOV key-phrase model into the ASR language model.

Example 29 includes the subject matter of any of Examples 25-28, wherein the updating of the ASR language model comprises means for generating an ASR key-phrase model by applying a phoneme-syllable based statistical language model to the user-provided WOV enrollment key-phrase and means for incorporating the generated ASR key-phrase model into the ASR language model.

Example 30 includes the subject matter of any of Examples 25-29, wherein the user-provided WOV enrollment key-phrase is provided as a text entry, the system further comprising means for performing a grapheme to phoneme conversion on the text entry for the generation of the WOV key-phrase model.

Example 31 includes the subject matter of any of Examples 25-30, wherein the triggering of the ASR processor comprises means for waking the ASR processor from a lower power consuming idle state to a higher power consuming recognition state.

Example 32 includes the subject matter of any of Examples 25-31, wherein the WOV processor consumes less power than the ASR processor when the ASR processor is in the higher power consuming recognition state.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for wake-on-voice (WOV) key-phrase enrollment, the method comprising:
generating, by a processor-based system, a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection; and
updating, by the processor-based system, an ASR language model based on the user-provided WOV enrollment key-phrase, the ASR language model employed by the ASR processor for recognizing speech utterances spoken by the user, wherein updating the ASR language model comprises generating an ASR key-phrase model by applying a phoneme-syllable based statistical language model to the user-provided WOV enrollment key-phrase and incorporating the generated ASR key-phrase model into the ASR language model.

2. The method of claim 1, wherein the user-provided WOV enrollment key-phrase is provided as a text entry, the method further comprising performing a grapheme to phoneme conversion on the text entry for the generation of the WOV key-phrase model.

3. The method of claim 1, wherein the triggering of the ASR processor comprises waking the ASR processor from a lower power consuming idle state to a higher power consuming recognition state.

4. The method of claim 3, wherein the WOV processor consumes less power than the ASR processor when the ASR processor is in the higher power consuming recognition state.

5. A system for wake-on-voice (WOV) key-phrase enrollment, the system comprising:
a WOV key-phrase model generation circuit to generate a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection;
an ASR model update circuit to update an ASR language model based on the user-provided WOV enrollment key-phrase, the ASR language model employed by the ASR processor for recognizing speech utterances spoken by the user; and
an ASR key-phrase model generation circuit to generate an ASR key-phrase model by applying a phoneme-syllable based statistical language model to the user-provided WOV enrollment key-phrase and incorporate the generated ASR key-phrase model into the ASR language model.

6. The system of claim 5, wherein the user-provided WOV enrollment key-phrase is provided as a text entry, the system further comprises a grapheme to phoneme conversion circuit to convert the text entry to phonemes for the generation of the WOV key-phrase model.

7. The system of claim 5, wherein the triggering of the ASR processor comprises waking the ASR processor from a lower power consuming idle state to a higher power consuming recognition state.

8. The system of claim 7, wherein the WOV processor consumes less power than the ASR processor when the ASR processor is in the higher power consuming recognition state.

9. A processor-implemented method for wake-on-voice (WOV) key-phrase enrollment, the method comprising:
generating, by a processor-based system, a WOV key-phrase model based on a user-provided WOV enrollment key-phrase, the WOV key-phrase model employed by a WOV processor for detecting of a correct sequence of sub-phonetic units of the WOV key-phrase spoken by the user and triggering operation of an automatic speech recognition (ASR) processor in response to the WOV key-phrase detection; and
updating, by the processor-based system, an ASR language model based on the user-provided WOV enrollment key-phrase, the ASR language model employed by the ASR processor for recognizing speech utterances spoken by the user, wherein updating the ASR language model comprises performing a sub-phonetic conversion of the WOV key-phrase model and incorporating the converted WOV key-phrase model into the ASR language model.

10. The method of claim 9, wherein the user-provided WOV enrollment key-phrase is provided as a text entry, the method further comprising performing a grapheme to phoneme conversion on the text entry for the generation of the WOV key-phrase model.

11. The method of claim 9, wherein the triggering of the ASR processor comprises waking the ASR processor from a lower power consuming idle state to a higher power consuming recognition state.

12. The method of claim 11, wherein the WOV processor consumes less power than the ASR processor when the ASR processor is in the higher power consuming recognition state.

* * * * *